(12) United States Patent
Noda (10) Patent No.: US 6,724,576 B2
(45) Date of Patent: Apr. 20, 2004

(54) MAGNETIC DISK APPARATUS HAVING RAMP ROAD STRUCTURE FIXED TO STATOR AND METHOD FOR MANUFACTURING THE SAME

(75) Inventor: Shunji Noda, Tokyo (JP)

(73) Assignee: TDK Corporation, Tokyo (JP)

( * ) Notice: Subject to any disclaimer, the term of this patent is extended or adjusted under 35 U.S.C. 154(b) by 183 days.

(21) Appl. No.: 09/963,898

(22) Filed: Sep. 26, 2001

(65) Prior Publication Data

US 2002/0039258 A1 Apr. 4, 2002

(30) Foreign Application Priority Data

Sep. 29, 2000 (JP) .......................... 2000-301493

(51) Int. Cl.[7] ................................ G11B 5/54
(52) U.S. Cl. ..................... 360/255; 360/254.8
(58) Field of Search .................. 360/254.6, 254.7, 360/254.8, 254.9, 255

(56) References Cited

U.S. PATENT DOCUMENTS 5,574,604 A  * 11/1996  Berg et al. ............... 360/254.8

FOREIGN PATENT DOCUMENTS

JP      7-272424       10/1995
JP      11-086476      3/1998

* cited by examiner

Primary Examiner—Robert S. Tupper (57) ABSTRACT

In a magnetic disk apparatus including a base, a magnetic head, a magnetic disk, and a spindle motor having a stator fixed to the base and a rotor for mounting the magnetic disk, a ramp road structure for parking the magnetic head is fixed to the stator.

13 Claims, 11 Drawing Sheets

MAGNETIC DISK APPARATUS HAVING RAMP ROAD STRUCTURE FIXED TO STATOR AND METHOD FOR MANUFACTURING THE SAME

BACKGROUND OF THE INVENTION

1. Field of the Invention

The present invention relates to a magnetic disk apparatus and a method for manufacturing the same.

2. Description of the Related Art

Generally, in a magnetic disk apparatus, a ramp road system has been adopted instead of a contact start stop (CSS) system, in view of the reliability characteristics, the high record density and the impact resistance characteristics (see: JP-A-7-272424 and JP-A-11-086476). That is, in the ramp road system, since a magnetic head is not in contact with a magnetic disk, the reliability characteristics are improved. Also, as the surface of the magnetic disk gets smoother, the floating amount of the magnetic head is reduced to increase the record density. Further, since the magnetic head hitting the magnetic disk is suppressed, a crash therebetween can be avoided, thus improving the impact resistance characteristics.

However, in a prior art magnetic disk apparatus including a base, a magnetic head, a magnetic disk, and a spindle motor having a stator fixed to the base, and a rotor for mounting the magnetic disk, a ramp road structure for packing the magnetic head is fixed to the stator. This will be explained later in detail. As a result, strict tolerance of the clearance between the magnetic disk and the ramp road cannot be guaranteed.

SUMMARY OF THE INVENTION

It is an object of the present invention to provide a magnetic disk apparatus capable of guaranteeing the strict tolerance of the clearance between a magnetic disk and a ramp road.

Another object is to provide a method for manufacturing the above-mentioned magnetic disk apparatus.

According to the present invention, in a magnetic disk apparatus including a base, a magnetic head, a magnetic disk, and a spindle motor having a stator fixed to the base, and a rotor for mounting the magnetic disk, a ramp road structure for parking the magnetic head is fixed to the stator.

BRIEF DESCRIPTION ON THE DRAWINGS

The present invention will be more clearly understood from the description set forth below, as compared with the prior art, with reference to the accompanying drawings, wherein.

DESCRIPTION OF THE PREFERRED EMBODIMENTS

Before the description of the preferred embodiments, a prior art magnetic disk apparatus will be explained with reference to FIG. 1 which is a plan view and FIG. 2 which is a cross-sectional view taken along the line II—II of FIG. 1.

Figure 1:
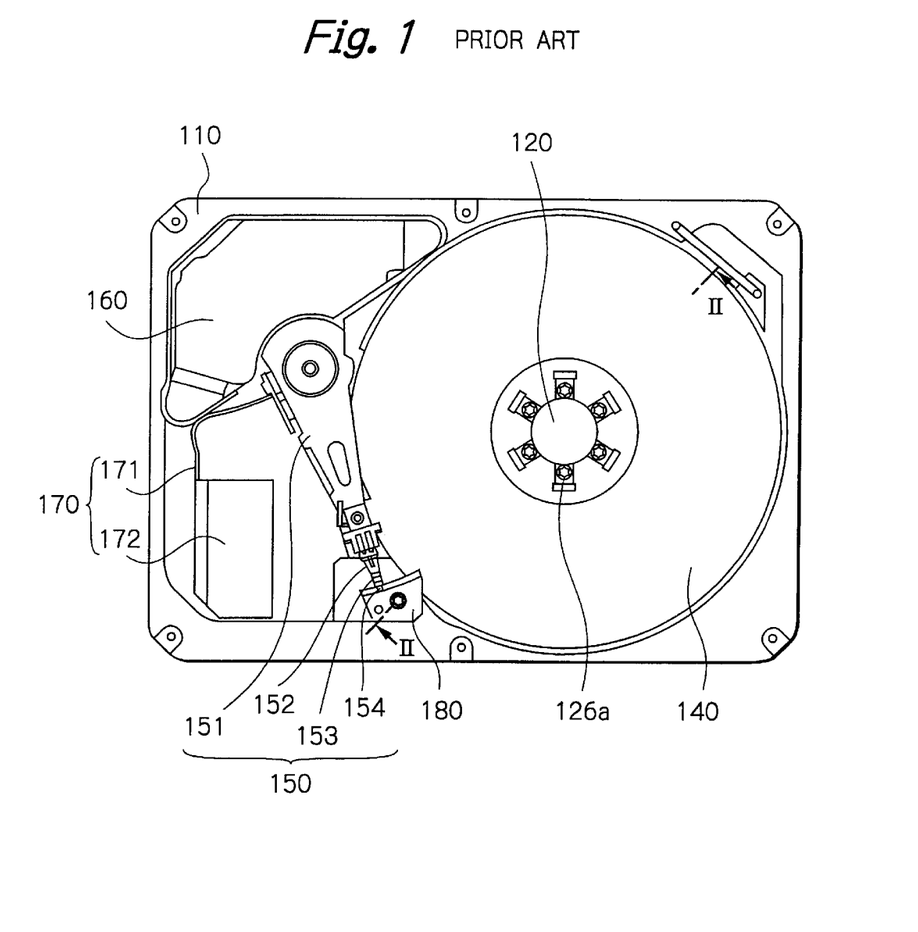
FIG. 1 is a plan view illustrating a prior art magnetic disk apparatus.
Figure 2:
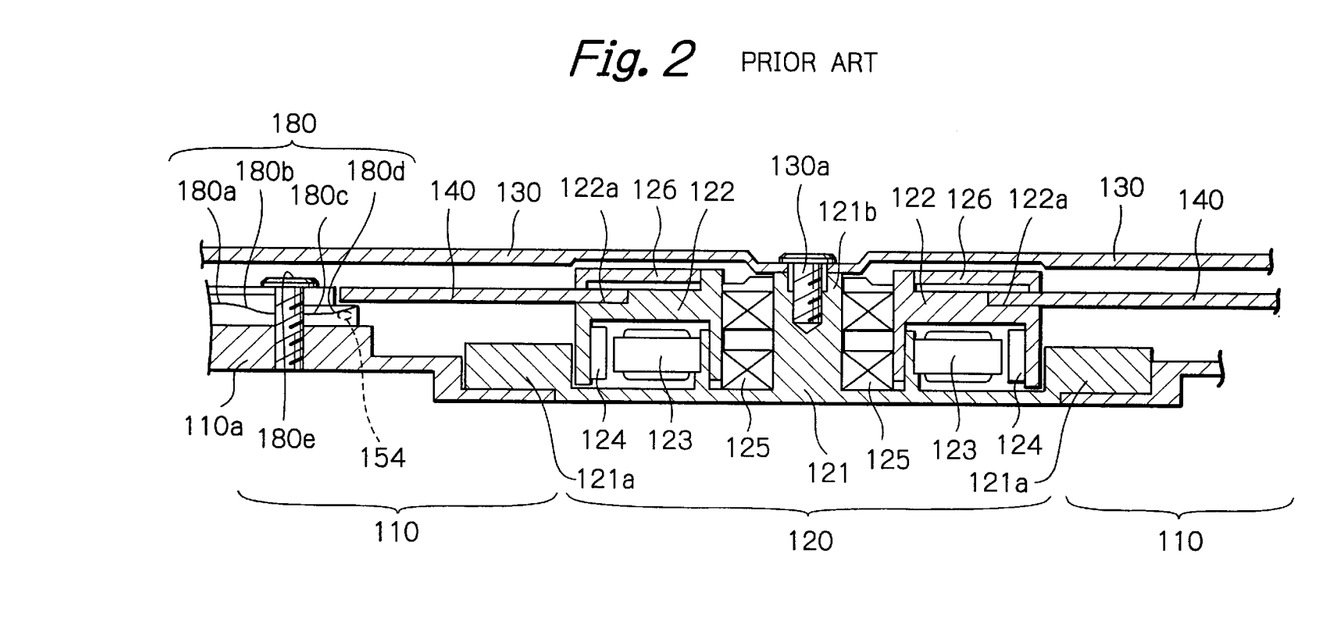
FIG. 2 is a cross-sectional view taken along the line II—II of FIG. 1.

In FIGS. 1 and 2, reference numeral 110 designates a base made of aluminum on which a spindle motor 120 is mounted. The spindle motor 120 is constructed by a stator 121 to which a cover 130 is fixed and a rotor 122 to which a magnetic disk 140 is fixed.

For example, the spindle motor 120 is of a DC type which further includes windings 123 and permanent magnets 124 for magnetic circuits, and bearings 125 between the stator 121 and the rotor 122. In this case, the windings 123 are fixed to the stator 121, while the permanent magnets 124 are fixed to the rotor 122.

The stator 121 has a circular extension 121a on the periphery of the rotor 122 and a cylindrical pillar 121b on the center of the stator 121. The circular extension 121a is fixed to the base 110. On the other hand, the cylindrical pillar 121b has a sidewall facing the bearings 125, and a top face to which the cover 130 is fixed by a screw 130a.

The rotor 122 has a hub portion 122a for mounting the magnetic disk 140 thereon. The magnetic disk 140 is clamped by a ring 126 using screws 126a.

Also, a carriage 150 is mounted on the base 110 and is pivoted by a voice coil motor 160. The carriage 150 is constructed by an arm 151, a suspension 152, a write/read head 153 and a bar 154. In this case, assume that the write/read head 153 is an up head for performing a write/read operation upon the back surface of the magnetic disk 140. Therefore, the suspension 152 is always activated to push up the write/read head 153 and the bar 154. The bar 154 will be explained later.

Also, a flexible printed circuit unit 170 is provided to transmit control signals and data signals from a control unit (not shown) to the write/read head 153 and vice versa. The flexible printed circuit unit 170 is formed by a movable section 171 fixed to the carriage 150 and a stationary section 172 fixed to the base 110.

The loading and unloading mechanism of the magnetic disk apparatus of FIGS. 1 and 2 is explained next.

A ramp road 180 is constructed by a parking area 180a, a slope area 180b, a slide area 180c and a slope area 180d and is fixed by a screw 180e to a pedestal portion 110a of the base 110. In this case, the slope area 180d is wedge-shaped and overlaps the periphery of the magnetic disk 140 by about 1 mm. That is, as the carriage 150 moves inward, the bar 154 pushed up by the suspension 152 slides from the parking area 180a via the slope area 180b, the slide area 180c and the slope area 180d to the back surface of the magnetic disk 140. In this case, since the slope area 180d is wedge-shaped, the write/read head 153 can smoothly land on the back surface of the magnetic disk 140. On the other hand, as the carriage 150 moves outward, the bar 154 pushed up by the suspension 152 slides from the back surface of the magnetic disk 140 via the slope area 180d, the slide area 180c and the slope area 180b to the parking area 180a. In this case, since the slope area 180d is wedge-shaped, the write/read head 153 can smoothly depart from the back surface of the magnetic disk 140.

The operation of the magnetic disk apparatus of FIGS. 1 and 2 is as follows. That is, when a power supply is turned ON, the spindle motor 120 rotates so that the spindle motor 120 becomes in a steady state in a few seconds. When the control unit (not shown) detects such a steady state, the control unit activates the voice coil motor 160, so that the bar 154 is moved from the parking area 180a to the back surface of the magnetic disk 140. As a result, the write/read head 153 is located at a predetermined position of the back surface of the magnetic so disk 140. In this case, the write/read head 153 is floating due to the balance between the spring force of the suspension 152 and the downward force of air current flowing beneath the rotating magnetic disk 140. On the other hand, when the control is in a standby mode, the control unit activates the voice coil motor 160, so that the bar 154 is moved from the back surface of the magnetic disk 140 to the parking area 180a. As a result, the write/read head 153 returns to the ramp road 180. Then, the spindle motor 120 stops its rotating operation.

In the magnetic disk apparatus of FIGS. 1 and 2, the tolerance of the clearance between the magnetic disk 140 and the ramp road 180, i.e., the slope area 180d thereof is very strict. For example, the optimum value of the clearance is about 0.2 mm, and the tolerance is required to be ±0.08 mm. If the above-mentioned clearance is too small, the ramp road 180 may collide with the magnetic disk 140, which abnormally rotates the spindle motor 120, thus destroying the apparatus of FIGS. 1 and 2. On the other hand, if the above-mentioned clearance is too large, the write/read head 153 crashes with the magnetic disk 140 when landing, so that the data thereof is damaged.

In the magnetic disk apparatus of FIGS. 1 and 2, however, since the ramp road 180 is mounted on the base 110, the above-mentioned tolerance ±0.08 mm cannot be guaranteed. That is, the tolerance of the hub portion 122a of the rotor 122 for defining the tolerance of the magnetic disk 140 with reference to the stator 121 is ±0.05 mm, and the tolerance of the periphery of the magnetic disk 140 with reference to the center thereof due to the warp thereof is ±0.03 mm. Therefore, the periphery of the magnetic disk 140 with reference to the stator 121 is ±0.08 mm. On the other hand, the tolerance of the ramp road 180 with reference to the stator 121, i.e., the tolerance of the pedestal portion 110a of the base 110 with reference to the stator 121 is ±0.02 mm. Therefore, the tolerance between the magnetic disk 140 and the ramp road 180 is ±0.1 mm.

Note that, since the base 110 is made of aluminum, the tolerance ±0.02 mm of the pedestal poriton 110a is attained by performing a post-polishing upon the pedestal portion 110a, which increases the manufacturing cost. On the other hand, if the base 110 is made of resin or the like, the tolerance ±0.02 mm of the pedestal portion 110a is impossible.

A first embodiment of the magnetic disk apparatus according to the present will be explained with reference to FIG. 3 which is a plan view and FIG. 4 which is a cross-sectional view taken along the line IV—IV of FIG. 3.

Figure 3:
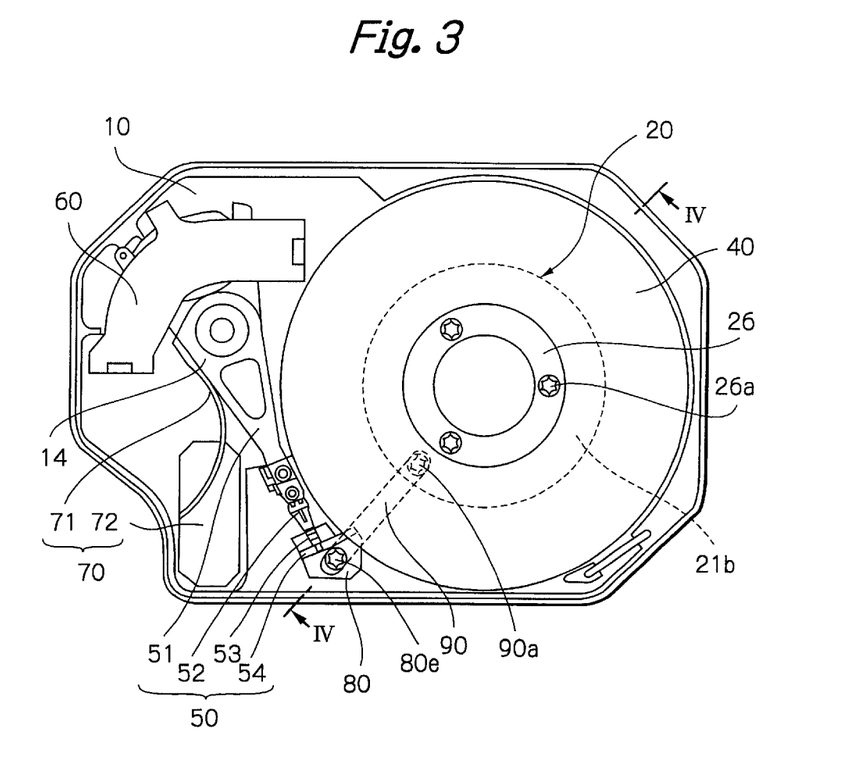
FIG. 3 is a plan view illustrating a first embodiment of the magnetic disk apparatus according to the present invention.
Figure 4:
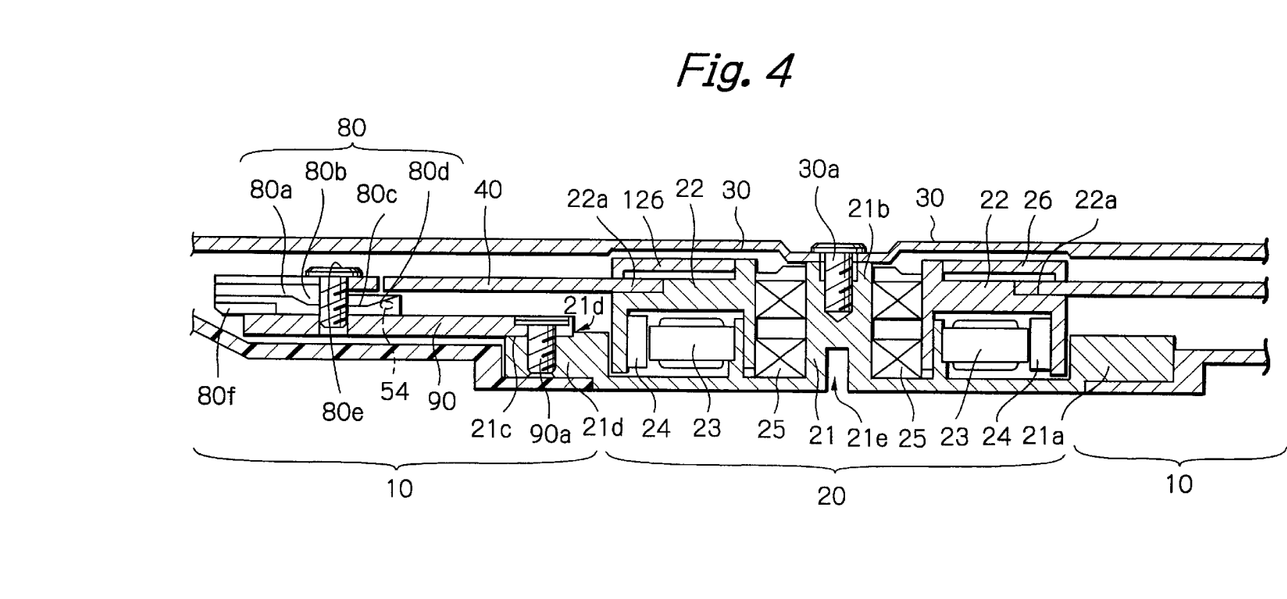
FIG. 4 is a cross-sectional view taken along the line IV—IV of FIG. 3.

In FIGS. 3 and 4, reference numeral 10 designates a base made of acrylonitride-butadiene-styrene (ABS) resin on which a spindle motor 20 is mounted. In this case, the ABS resin includes antistatic carbon. The spindle motor 20 is constructed by a stator 21 to which a cover 30 is fixed and a rotor 22 to which a 3-inch diameter magnetic disk 40 is fixed.

For example, the spindle motor 20 is of a DC type which further includes windings 23 and permanent magnets 24 for magnetic circuits, and bearings 25 between the stator 21 and the rotor 22. In this case, the windings 23 are fixed to the stator 21, while the permanent magnets 24 are fixed to the rotor 22.

The stator 21 has a circular extension 21a on the periphery of the rotor 22 and a cylindrical pillar 21b on the center of the stator 21. The circular extension 21a is fixed to the base 10. On the other hand, the cylindrical pillar 21b has a sidewall facing the bearings 25, and a top face to which the cover 30 is fixed by a screw 30a.

The rotor 22 has a hub portion 22a for mounting the magnetic disk 40 thereon. The magnetic disk 40 is clamped by a ring 26 using screws 26a.

Also, a carriage 50 is mounted on the base 10 and is pivoted by a voice coil motor 60. The carriage 50 is constructed by an arm 51, a suspension 52, a write/read head 53 and a bar 54. In this case, assume that the write/read head 53 is an up head for performing a write/read operation upon the back surface of the magnetic disk 40. Therefore, the suspension 52 is always activated to push up the write/read head 53 and the bar 54. The bar 54 will be explained later.

Also, a flexible printed circuit unit 70 is provided to transmit control signals and data signals from a control unit (not shown) to the write/read head 53 and vice versa. The flexible printed circuit unit 70 is formed by a movable section 71 fixed to the carriage 50 and a stationary section 72 fixed to the base 10.

The loading and unloading mechanism of the magnetic disk apparatus of FIGS. 3 and 4 is explained next.

A ramp road 80 is constructed by a parking area 80a, a slope area 80b, a slide area 80c and a slope area 80d and is fixed by a screw 80e to a frame 90 which is also fixed by a screw 90a to a pedestal portion 21c of the stator 21. In this case, the pedestal portion 21c has a butt portion 21d on the circular extension 21a of the stator 21. Note that the butt portion 21d can be replaced by a pin provided on the circular extension 21a for positioning the frame 90. Also, a motor positioning hole 21e is perforated on the center bottom of the stator 21. This motor positioning hole 21e is used when assembling the magnetic disk apparatus of FIGS. 3 and 4. Further, the slope area 80d is wedge-shaped and overlaps the periphery of the magnetic disk 40 by about 1 mm. That is, as the carriage 50 moves inward, the bar 54 pushed up by the suspension 52 slides from the parking area 80a via the slope area 80b, the slide area 80c and the slope area 80d to the back surface of the magnetic disk 40. In this case, since the slope area 80d is wedge-shaped, the write/read head 53 can smoothly land the back surface of the magnetic disk 40. On the other hand, as the carriage 50 moves outward, the bar 54 pushed up by the suspension 52 slides from the back surface of the magnetic disk 40 via the slope area 80d, the slide area 80c and the slope area 80b to the parking area 80a. In this case, since the slope area 80d is wedge-shaped, the write/read head 53 can smoothly depart from the back surface of the magnetic disk 40.

Note that a shade 80f is provided to prevent the bar 54 from jumping from the parking area 80a.

Figure 5:
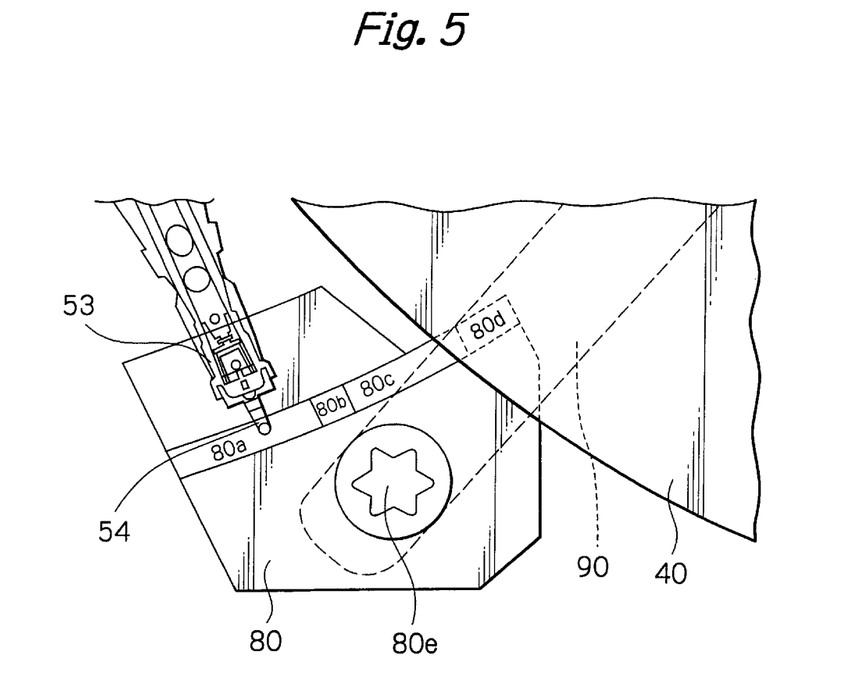
FIG. 5 is an enlargement of the write/read head and the bar of FIGS. 3 and 4.

In FIG. 5, which is an enlargement of the write/read head 53 and the bar 54 of FIGS. 3 and 4, when the write/read lead 53 is moved from and to the magnetic disk 40, the bar 54 moves along the ramp road 80, i.e., the parking area 80a, the slope area 80b, slide area 80c and the slope area 80d.

Figure 6A:
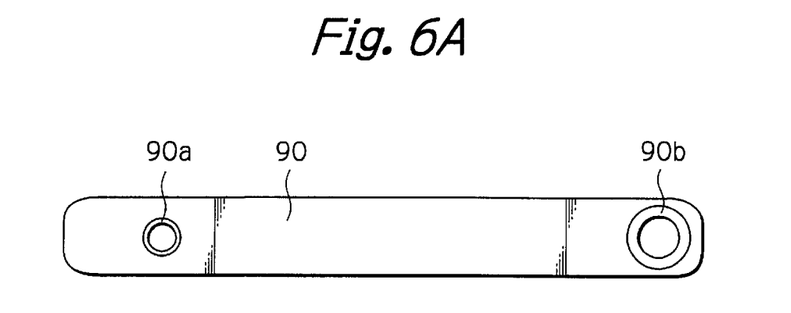
FIGS. 6A and 6B are a plan view and a side view, respectively, of the frame of FIGS. 3 and 4.
Figure 6B:
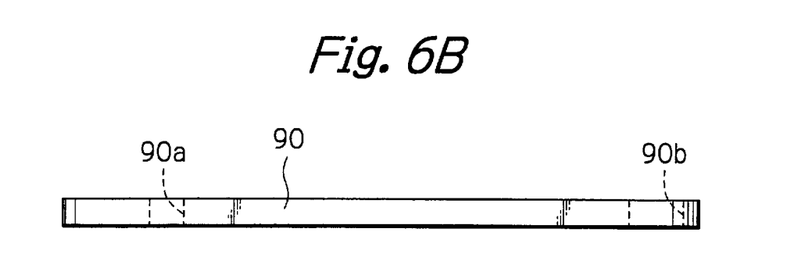

FIGS. 6A and 6B are a plan view and a side view, respectively, of the frame 90 of FIGS. 3 and 4. As illustrated in FIGS. 6A and 6B, the frame 90 is a flat plate made of stainless steel, in which screw holes 90a and 90b for the screws 80e and 90a, respectively, are perforated. Since the frame 90 is made of stainless steel, the frame 90 has a high dimension accuracy.

Figure 7A:
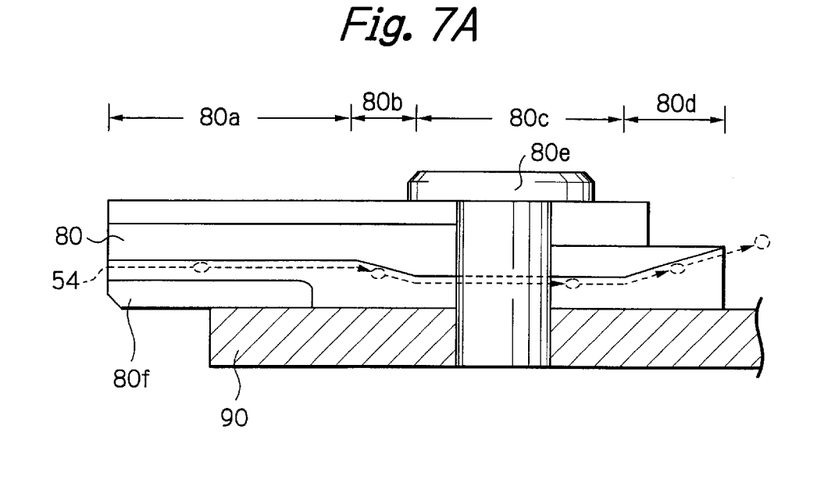
FIGS. 7A and 7B are cross-sectional views for explaining the operation of the magnetic disk apparatus of FIGS. 3 and 4.
Figure 7B:
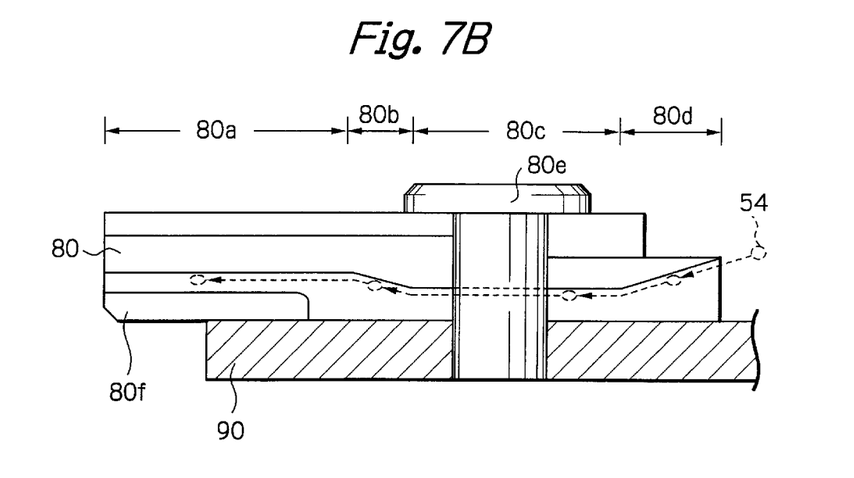

The operation of the magnetic disk apparatus of FIGS. 3 and 4 is explained next with reference to FIGS. 7A and 7B. That is, when a power supply is turned ON, the spindle motor 20 rotates so that the spindle motor 20 becomes in a steady state in a few seconds. When the control unit (not shown) detects such a steady state, the control unit activates the voice coil motor 60, so that the bar 54 is moved from the parking area 80a via the slope area 80b, the slide area 80c and the slide area 80d to the back surface of the magnetic disk 40, as illustrated in FIG. 7A. As a result, the write/read head 53 is located at a predetermined position of the back surface of the magnetic disk 40. In this case, the write/read head 53 is floating due to the balance between the spring force of the suspension 52 and the downward force of air current flowing beneath the rotating magnetic disk 40. On the other hand, when the control is in a standby mode, the control unit activates the voice coil motor 60, so that the bar 54 is moved from the back surface of the magnetic disk 40 via the slope area 80d, the slide area 80c and the slope area 80b to the parking area 80a, as illustrated in FIG. 7B. As a result, the write/read head 53 returns to the ramp road 80. Then, the spindle motor 20 stops its rotating operation.

Even in the magnetic disk apparatus of FIGS. 3 and 4, the tolerance of the clearance between the magnetic disk 40 and the ramp road 80, i.e., the slope area 80d thereof is very strict. For example, the optimum value of the clearance is about 0.2 mm, and the tolerance is required to be ±0.08 mm, in the same way as in the magnetic disk apparatus of FIGS. 1 and 2.

In the magnetic disk apparatus of FIGS. 3 and 4, since the ramp road 80 is mounted on the stator 21, the above-mentioned tolerance ±0.08 mm can be guaranteed. That is, the tolerance of the hub portion 22a of the rotor 22 for defining the tolerance of the magnetic disk 40 with reference to the stator 21 is ±0.05 mm, and the tolerance of the periphery of the magnetic disk 40 with reference to the center thereof due to the warp thereof is ±0.03 mm. Therefore, the periphery of the magnetic disk 40 with reference to the stator 21 is ±0.08 mm. On the other hand, the tolerance of the ramp road 80 with reference to the stator 21, i.e., the tolerance of the pedestal portion 21c of the stator 21 with reference to the stator 21 is substantially zero due to the stainless steel frame 90. Actually, the tolerance of the ramp road 80 with reference to the stator 21 is ±0.005 mm. Therefore, the tolerance between the magnetic disk 40 and the ramp road 80 is ±0.08 mm.

Note that, if the base 10 is made of resin or the like, the large tolerance thereof does not affect the tolerance of the ramp road 80.

The method for manufacturing the magnetic disk apparatus of FIGS. 3 and 4 will explained next with reference to FIGS. 8A, 8B, 8C, 8D and 8E.

Figure 8A:
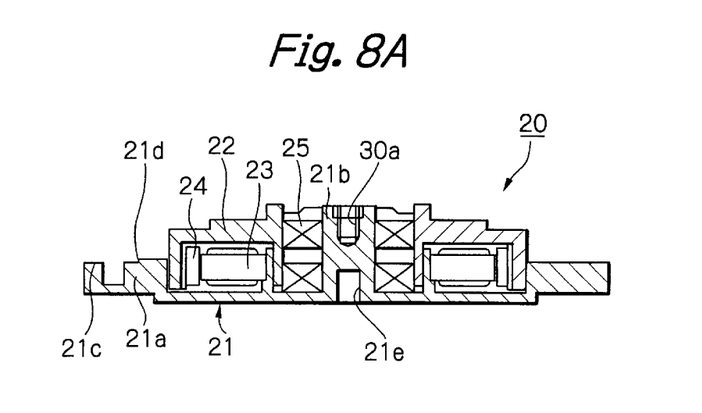
FIGS. 8A, 8B, 8C, 8D and 8E are diagrams for explaining a method for manufacturing the magnetic disk apparatus of FIGS. 3 and 4.

First, referring to FIG. 8A, an assembled spindle motor 20 is prepared.

Figure 8B:
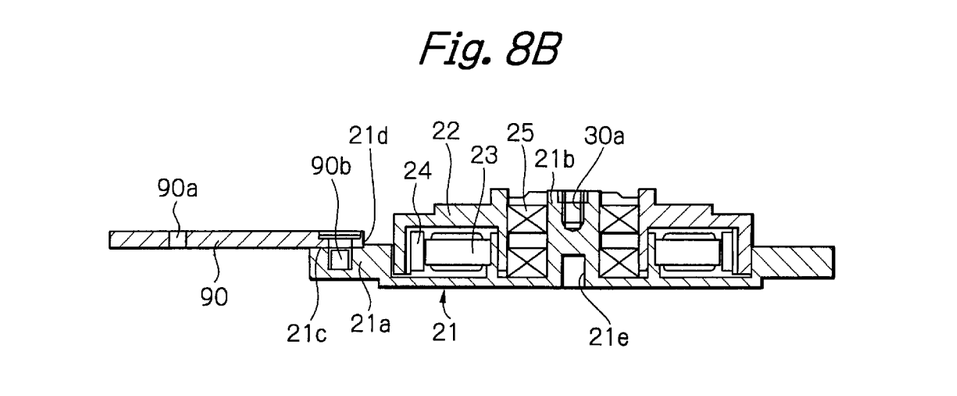

Next, referring to FIG. 8B, a frame 90 is fixed by a screw 90b to the pedestal portion 21c of the stator 21 using the butt portion 21d thereof.

Figure 8C:
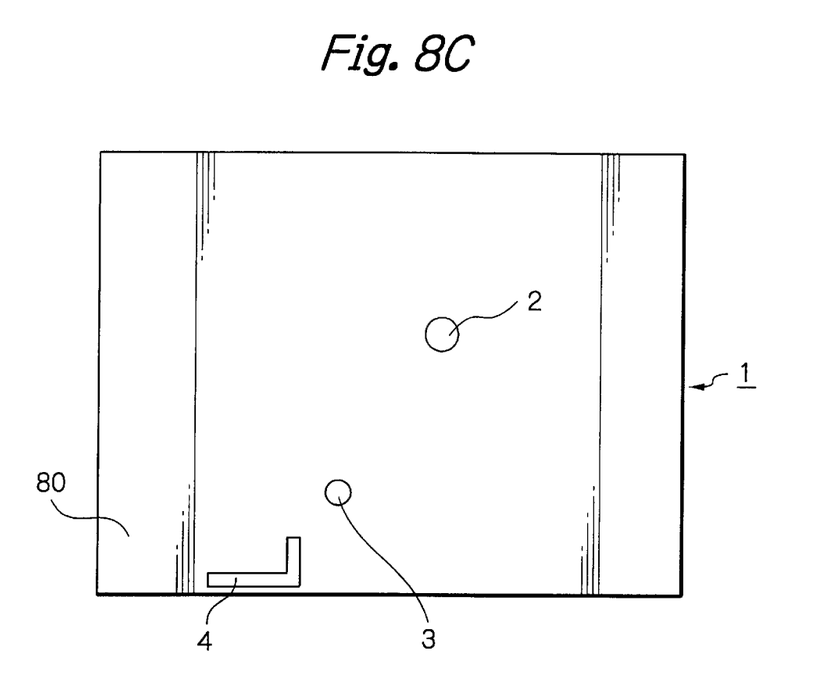

Next, referring to FIG. 8C, a jig 1 having a motor positioning pin 2, a frame positioning pin 3 and a ramp positioning butt 4 is prepared.

Figure 8D:
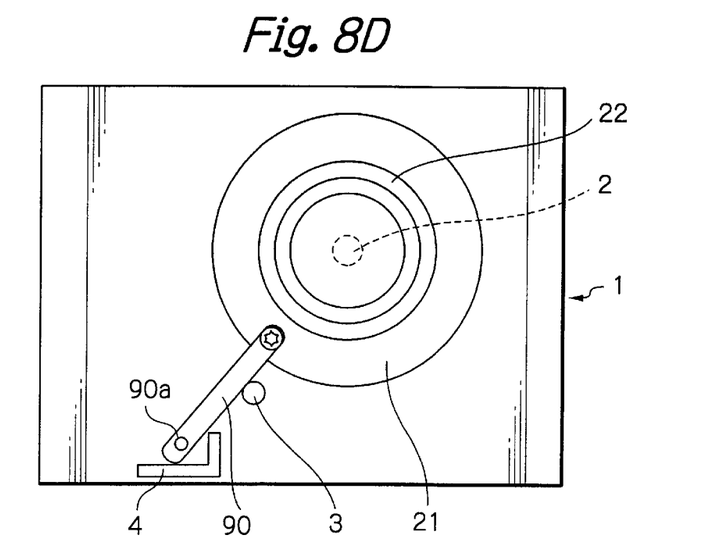

Next, referring to FIG. 8D, the spindle motor 20 associated with the frame 90 as illustrated in FIG. 8B is placed on the jig 1 of FIG. 8C, so that the motor positioning hole 21e of the spindle motor is fitted onto the motor positioning pin 2. Then, the spindle motor 20 associated with the frame 90 is rotated so that the frame 90 abuts against the frame positioning pin 3.

Figure 8E:
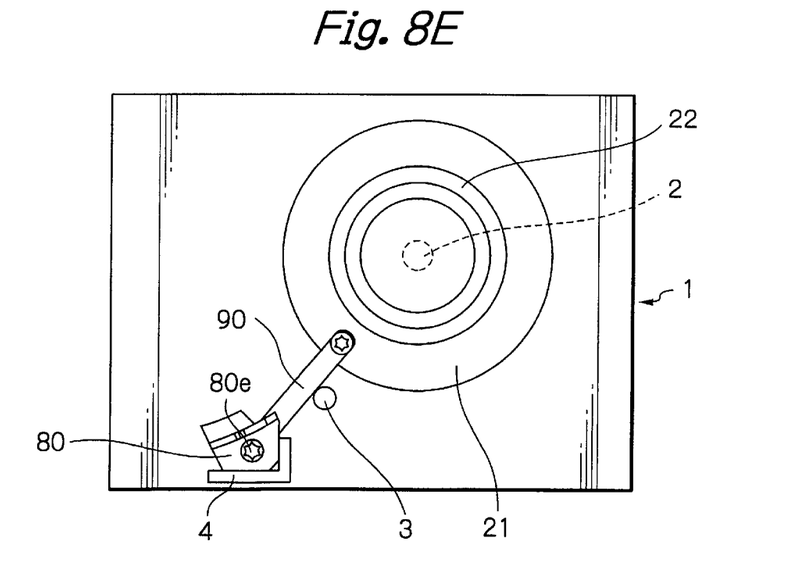

Finally, referring to FIG. 8E, a ramp road 80 is fixed by a screw 80e to the frame 90 using the ramp positioning butt 4.

In the manufacturing method as illustrated in FIGS. 8A, 8B, 8C, 8D and 8E, since the relative positions of the motor positioning pin 2, the frame positioning pin 3 and the ramp positioning butt 4 have a high accuracy whose tolerance is less than ±0.010 mm, the horizontal position accuracy among the spindle motor 20, the frame 90 and the ramp 80 is very high.

Figure 9:
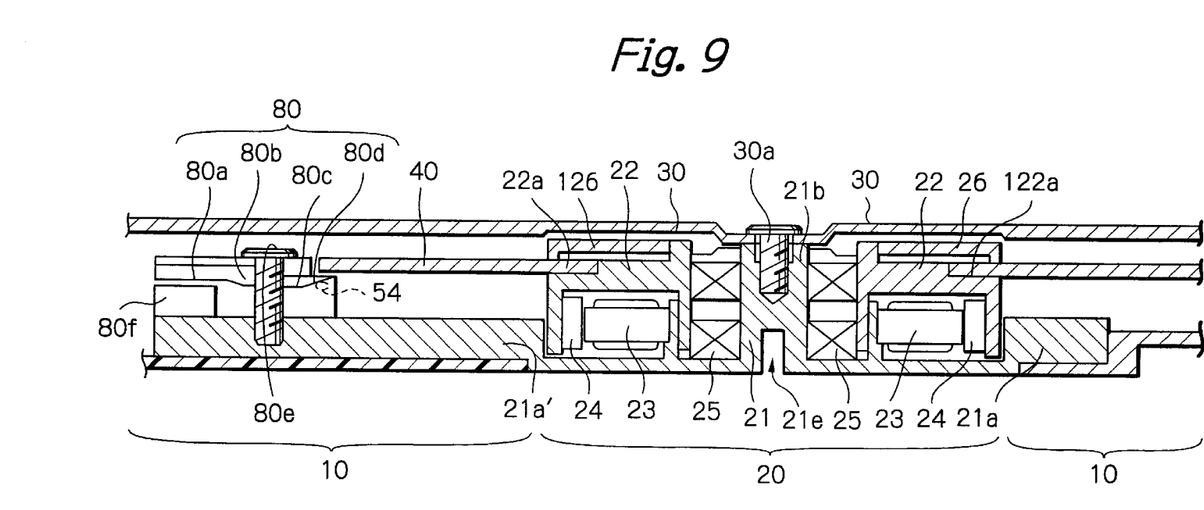
FIG. 9 is a cross-sectional view illustrating a second embodiment of the magnetic disk apparatus according to the present invention.

In FIG. 9, which illustrates a second embodiment of the magnetic disk apparatus according to the present invention, the ramp road 80 is directly fixed by a screw 80e to a circular extension 21a', and accordingly, the frame 90 is not provided. Even in this case, the tolerance of the ramp road 80 with reference to stator 21 is substantially zero.

The stator 21 of FIG. 9 is larger than that of FIGS. 3 and 4 due to the larger circular extension 21a'. However, the circular extension 21a' can be replaced by an extension for mounting only the ramp road 80 to reduce the size of the stator 21.

In the above-described embodiments, the magnetic disk 40 can be a flexible floppy disk or a hard disk. Also, the magnetic disk 40 can be replaced by an optical disk. Also, the present invention can be applied to a magnetic disk apparatus having a down head for performing a write/read operation of the front surface of the magnetic disk 40.

Additionally, since the base 10 is made of resin, the base 10 is lighter than the aluminum base 110 of FIGS. 1 and 2 by about 100 g, which contributes to the portability of the magnetic disk apparatuses.

As explained hereinabove, according to the present invention, since a ramp road is mounted on a stator, the tolerance of the clearance between the ramp road and a disk can be reduced.

What is claimed is:

1. A magnetic disk apparatus comprising:
    a base;
    a magnetic head;
    a magnetic disk;
    a spindle motor having a stator fixed to said base and a rotor for mounting said magnetic disk;
    a ramp road structure, provided at an outer periphery of said magnetic disk; and
    a frame coupled between said stator and said ramp road structure, said frame being provided between said magnetic disk and said base.

2. The apparatus as set forth in claim 1, wherein said stator comprises a circular extension to which said frame is fixed.

3. The apparatus as set forth in claim 2, wherein said circular extension comprises a butt portion against which said frame abuts.

4. The apparatus as set forth in claim 2, wherein said frame is fixed by a screw to said circular extension.

5. The apparatus as set forth in claim 1, wherein said frame is a flat plate.

6. The apparatus as set forth in claim 1, wherein said frame is made of stainless steel.

7. The apparatus as set forth in claim 1, wherein said base is made of resin.

8. A magnetic disk apparatus comprising:

a base;

a magnetic head;

a magnetic disk;

a spindle motor having a stator fixed to said base and a rotor for mounting said magnetic disk, said stator comprising an extension; and a ramp road structure provided at an outer periphery of said magnetic disk, said ramp road structure being directly fixed to said extension of said stator.

9. The apparatus as set forth in claim 8, wherein the extension of said stator is circular.

10. The apparatus as set forth in claim 8, wherein said base is made of resin.

11. A magnetic disk apparatus comprising:

a base;

a magnetic head;

a magnetic disk; a spindle motor having a stator fixed to said base and a rotor for mounting said magnetic disk; and a ramp road structure, fixed to said stator, for parking said magnetic head, wherein said ramp road structure comprises:

a parking area section for parking said magnetic head;

a first slope area section adjacent to said parking area section;

a slide area section adjacent to said first slope area section;

a second slope area section adjacent to said slide area section; and a shade section, opposing said parking area section, for preventing said magnetic head from being jumped from said parking area section.

12. A magnetic disk apparatus comprising:

a base;

a magnetic head;

a magnetic disk;

a spindle motor having a stator fixed to said base and a rotor for mounting said magnetic disk, said stator comprising an extension;

a plate-type frame fixed to said extension of said stator, said plate-type frame being provided between said magnetic disk and said base; and a ramp road structure, fixed to said plate-type frame, for parking said magnetic head, said ramp road structure being provided at an outer periphery of said magnetic disk.

13. A magnetic disk apparatus comprising:

a base;

a magnetic head;

a magnetic disk;

a spindle motor having a stator fixed to said base and a rotor for mounting said magnetic disk, said stator comprising an extension; and a ramp road structure, fixed directly to said extension of said stator, for parking said magnetic head, said ramp road structure being provided at an outer periphery of said magnetic disk.

* * * * *